(No Model.) 2 Sheets—Sheet 1.
J. K. TULLIS.
LEATHER LINK BELTING.
No. 499,613. Patented June 13, 1893.
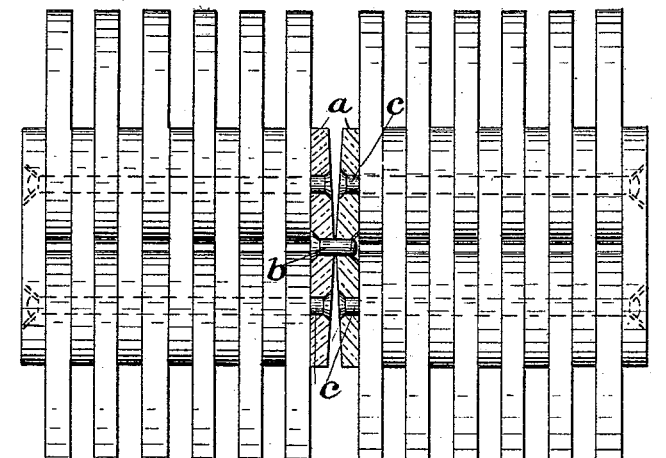
FIG. I.
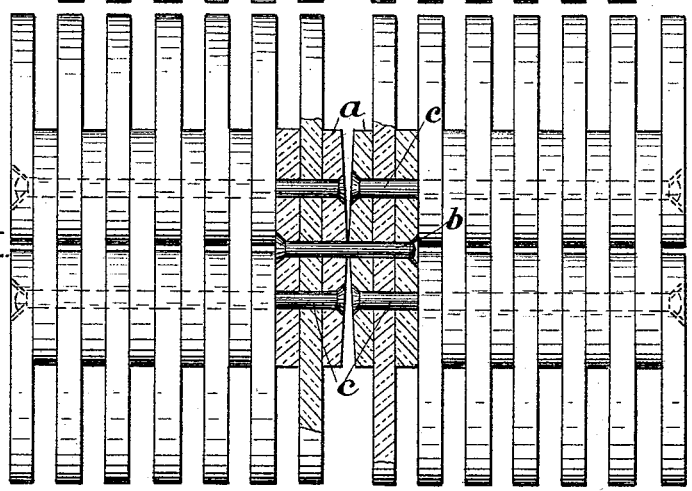
FIG. II.
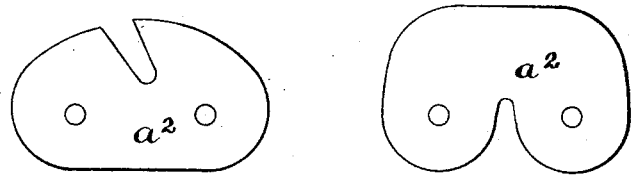
FIG. III.
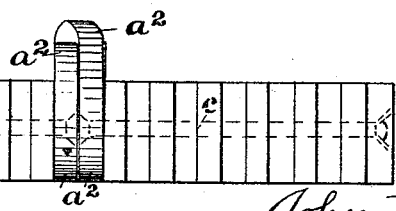
FIG. IV.
Attest:
Walter E. Allen.
Walter Allen.
Inventor.
John K. Tullis.
By Knight Bros.
Attorneys.

(No Model.) 2 Sheets—Sheet 2.
J. K. TULLIS.
LEATHER LINK BELTING.
No. 499,613. Patented June 13, 1893.
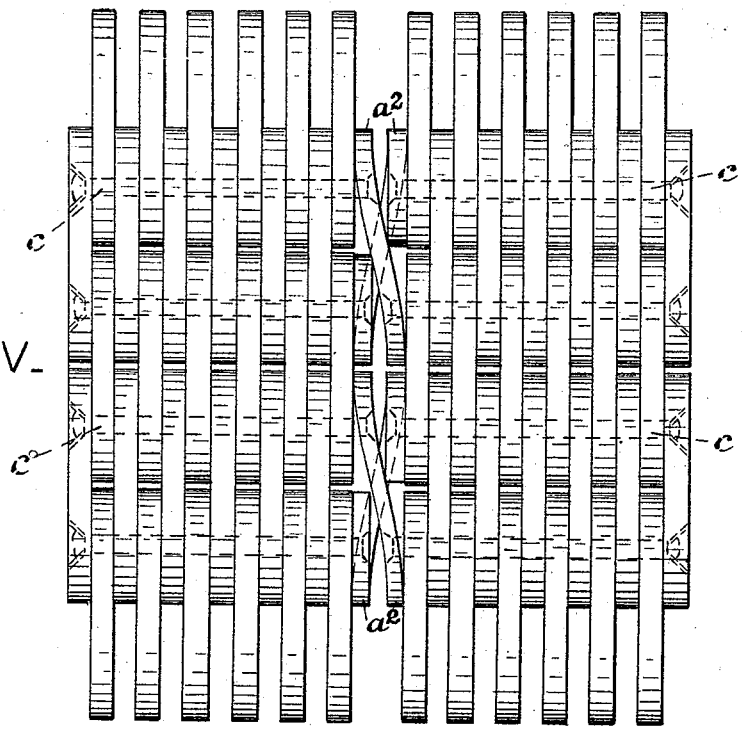
FIG. V.
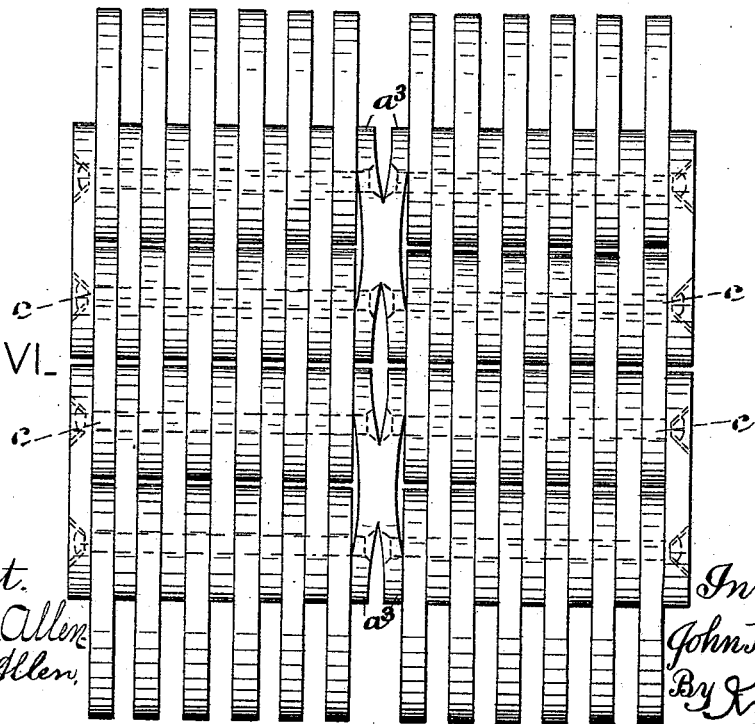
FIG. VI.
Attest.
Walter E. Allen
Walter Allen
Inventor.
John K. Tullis
By Knight Bro.
Attorneys.

UNITED STATES PATENT OFFICE.

JOHN KEIL TULLIS, OF GLASGOW, SCOTLAND.

LEATHER LINK-BELTING.

SPECIFICATION forming part of Letters Patent No. 499,613, dated June 13, 1893.

Application filed June 7, 1890. Serial No. 354,620. (No model.)

*To all whom it may concern:*

Be it known that I, JOHN KEIL TULLIS, of the firm of John Tullis & Son, leather-belt manufacturers, St. Ann's Leather Works, John street, Bridgeton, Glasgow, in the county of Lanark, Scotland, have invented certain new and useful Improvements in Leather Link-Belting, of which the following is a specification.

My invention, which relates to improvements in leather link belting has for its object to construct the belting so that it will lie to the form of the pulley on which it runs, and it consists in a series of links so connected to the belt sections that they form a strong and flexible joint.

In order that my invention may be fully understood I will proceed to describe it with reference to the accompanying drawings, in which—

Figure I is in part a plan view and in part a horizontal section of a piece of belting showing my improved leather link belting. Fig. II is a similar view but showing the rivets passing through several of the belt sections as hereinafter described. Fig. III is an elevation of a slightly different form of link showing the parts separated. Fig. IV is an end view of a piece of belting provided with the form of link shown in Fig. III. Fig. V is a plan view of a piece of belting provided with the same form of link. Fig. VI is a plan view showing another form of link.

In Figs. I and II the flexible link for connecting the belt sections consists of the strips *a a* riveted together in the center by the rivet *b* and form a double link having its ends extending in line with the belting and free at their inner sides. Each of these strips is provided with two holes so that the one strip is connected to the one half or side of the belting, and the other strip to the other half or side of the belting by passing pins or rivets *c* through each connecting strip and through the belt-sections. In place of having the rivet *b* passing only through the center of the strips *a a* as shown in Fig. I, I may extend it so that it will pass through one or two of the belt-sections as shown in Fig. II.

In Figs. III, IV and V, $a^2$, $a^2$, are strips also forming links. Each of these strips is provided with a slot so that the one strip fits into or is mortised to the other strip, thus forming a sort of X-shaped link so that one end of each strip is connected to one side of the belting and the other end to the other side by passing pins or rivets *c c*, through the holes in each strip in a manner similar to that heretofore described.

In Figs. III and IV the links formed by the strips $a^2$ $a^2$ project beyond the surface of the belting; but they may be made flush with the belting as shown in Fig. V.

In Fig. VI the links are composed of strips $a^3$ $a^3$ which instead of being riveted together as shown in Figs. I and II are formed integral at their mid-length. In this instance the link is made by splitting a thick piece out a sufficient portion of its length to form the strips $a^3$, $a^3$, and to allow the pins or rivets *c, c,* to be inserted as in the forms heretofore described.

It is to be understood that one or more links or joints may be used, according to the breadth of the belting required.

Having thus described my invention, the following is what I claim as new therein and desire to secure by Letters Patent—

1. Leather-link belting comprising belt-sections having flexible connecting links consisting of pairs of flexible strips, extending lengthwise of the belting; each pair of strips being connected at their middle portions only and free at the ends of their inner sides; substantially as described.

2. The combination, with the belt-sections; of flexible links arranged between them and consisting of strips having slots or mortises adapted to fit together whereby said strips may be secured to each other, and said strips being secured at their ends to the belt-sections; substantially as described.

In testimony whereof I have signed my name to this specification in the presence of two subscribing witnesses.

JOHN KEIL TULLIS.

Witnesses:
 JOHN LIDDLE,
 ARTHUR HARTLEY GUILE,
*Both of 154 St. Vincent Street, Glasgow.*